United States Patent
Pommereau et al.

(10) Patent No.: US 6,309,904 B1
(45) Date of Patent: Oct. 30, 2001

(54) METHOD OF FABRICATING AN OPTICAL INTEGRATED CIRCUIT

(75) Inventors: Frédéric Pommereau, Lardy; Philippe Pagnod-Rossiaux, St Germain les Arpajon; Monique Renaud, Saint Cheron; Bernard Martin, La Varenne St Hilaire; Roland Mestric, Paris, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/339,236

(22) Filed: Jun. 24, 1999

(30) Foreign Application Priority Data

Jul. 6, 1998 (FR) .................................................. 98 08622

(51) Int. Cl.[7] .................................................. H01L 21/00
(52) U.S. Cl. .................................................. 438/31; 216/24
(58) Field of Search ........................... 216/24, 51; 438/31

(56) References Cited

U.S. PATENT DOCUMENTS

| | | | |
|---|---|---|---|
| 5,488,678 | * | 1/1996 | Taneya et al. ........................ 385/14 |
| 5,539,845 | * | 7/1996 | Van der Tol ........................... 385/11 |
| 5,661,077 | * | 8/1997 | Oh et al. ............................... 438/31 |
| 5,753,524 | * | 5/1998 | Bodere et al. ........................ 437/39 |
| 5,776,792 | * | 7/1998 | Naito et al. ........................... 438/31 |
| 5,796,902 | * | 8/1998 | Bhat et al. ........................... 385/122 |
| 5,862,168 | * | 1/1999 | Schilling et al. ..................... 372/50 |
| 5,863,809 | * | 1/1999 | Koren .................................. 438/22 |
| 6,025,207 | * | 2/2000 | Mersali et al. ....................... 438/29 |
| 6,108,481 | * | 8/2000 | Tohyama et al. ................... 385/131 |
| 6,156,582 | * | 12/2000 | Shieh et al. ......................... 438/29 |

FOREIGN PATENT DOCUMENTS

| | | |
|---|---|---|
| 0 532 816 A1 | 3/1993 | (EP) . |
| 0 807 835 A2 | 11/1997 | (EP) . |
| WO 97/49150 | 12/1997 | (WO) . |

* cited by examiner

Primary Examiner—Randy Gulakowski
Assistant Examiner—Jiri F. Smetana
(74) Attorney, Agent, or Firm—Sughrue, Mion, Zinn, Macpeak & Seas, PLLC (57) ABSTRACT

A method of fabricating an optical integrated circuit comprising at least one etched and buried BRS waveguide coupled to at least one etched but not buried ridge waveguide includes defining an imprint for the two types of guide beforehand, using a common mask, and then defining the two types of guide by successive etching operations.

7 Claims, 8 Drawing Sheets

FIG_1A

FIG_1B

FIG_1C

FIG_1D

FIG_2A

FIG_2B

FIG_2C

FIG_2D

FIG_3A

FIG_3B

FIG_4A

FIG_4B

FIG_4C

FIG_5

FIG_6A

FIG_6B

FIG_9A

FIG_9B

FIG_9C

METHOD OF FABRICATING AN OPTICAL INTEGRATED CIRCUIT

BACKGROUND OF THE INVENTION

1. Field of the Invention

The present invention relates to a method of fabricating an optical integrated circuit comprising waveguides having different structures. The optical integrated circuit fabricated in accordance with the invention includes at least one BRS (Buried Ridge Stripe) waveguide which is etched and buried in a cladding layer and at least one ridge waveguide which is etched but not buried.

2. Description of the Prior Art

Optical integrated circuits are designed to combine a plurality of types of optical component having different structures and functions. Such circuits are made in two stages. In a first stage the various active and/or passive components are integrated on a substrate and butt coupled using a method well known to the skilled person. In a second stage the waveguides of the various components are etched in the form of stripes in order to assure lateral confinement of light.

The most widely used method for defining the waveguide stripes uses auto-alignment. For this, all the waveguides are etched simultaneously, in a single step, using a single mask.

This method is illustrated by FIGS. 1A to 1D which are diagrammatic perspective views of an optical circuit at various stages of its fabrication. A BRS active waveguide 11 and a ridge passive waveguide 12 are integrated into the circuit.

In a first stage, a plurality of stacked layers of InP, for example, are deposited on a substrate 5 to form two portions 1 and 2 as shown in FIG. 1A. The first portion 1 is for an active component, for example, and includes a guide layer 7 of quaternary material, for example InGaAsP, having a forbidden band width equivalent to 1.5 $\mu$m. The guide layer 7 is etched in the form of one or more stripes and then buried to form one or more BRS waveguides.

The second portion 2 is for a passive component, for example, and includes a guide layer 3 of quaternary material, for example InGaAsP, having a forbidden band width equivalent to 1.1 $\mu$m. The guide layer 3 is etched in the form of one or more stripes to form one or more ridge waveguides.

The two guide layers 3 and 7 of the two portions are butt coupled and encapsulated in a confinement layer 4 of InP, for example. The confinement layer 4 can be different in each portion. A conventional mask 9 defining the various waveguides to be produced is positioned on the confinement layer(s) 4.

The next step, shown in FIG. 1B, consists in simultaneously or sequentially etching the two portions 1 and 2 on either side of the mask 9 to define the stripes of the various waveguides. In the example shown in FIG. 1B, the BRS waveguide 11 and the ridge waveguide 12 are etched in the form of respective single stripes. When etching is complete the mask 9 is removed.

When the stripe of each waveguide 11 and 12 has been defined, it is then necessary to be able to bury the BRS active guide 11 in a cladding layer without filling the etched part of the ridge waveguide 12. FIG. 1C is a diagram illustrating this operation of encapsulating the BRS waveguide.

For this, a layer 8 of dielectric material, for example silica, is deposited onto the ridge stripe to protect it during subsequent epitaxial growth of a confinement layer 6 to bury the BRS guide. The confinement layer 6 is made of p-doped InP, for example. When the confinement layer 6 has been deposited, the silica protective layer 8 is removed and an optical integrated circuit 10 as shown in FIG. 1D is obtained, including a component with a buried BRS waveguide 11 and a component with a ridge waveguide 12.

However, during epitaxial growth using the MOCVD (Metal Organic Chemical Vapor Deposition) process, excrescences are formed in the transition area Z between the two portions 1 and 2. These excrescences can have a size of up to several microns, typically being more than 4 $\mu$m thick and more than 300 $\mu$m wide.

During epitaxial growth the circuit is heated by infrared lamps. This heating causes decomposition of the reactants on or near the surfaces followed by a phenomenon of nucleation. This nucleation does not occur on the dielectric material (silica, for example) and so the InP layer deposited epitaxially cannot grow on the silica protective layer 8. Consequently, all the elements on top of the layer 8 diffuse into and coalesce in the transition area Z on the InP material of the confinement layer 6 being formed. All of the material that should have been grown on the silica therefore ends up in the transition area Z, which causes the excrescences to appear, their size depending on the size of the surfaces protected by the silica layer 8.

These excrescences interfere with subsequent circuit fabrication operations. Lithographic steps in particular and ion implantation of the cladding layer to obtain lateral insulation are particularly difficult to carry out on the circuit because of the presence of these excrescences. Also, a differential thickness is created along the BRS active waveguide stripe which can cause malfunctions of the waveguide.

Also, protecting the ridge guide 3 with silica implies migration of P and/or As from the waveguide 3 toward the dielectric silica layer 8, which degrades the performance of the waveguide and therefore of the optical component 2.

Another approach to making an optical integrated circuit comprising at least one BRS waveguide and one ridge waveguide consists in using the realignment method well known to the skilled person and illustrated in FIGS. 2A to 2D. After depositing a plurality of layers onto a substrate 5 to form two portions 1 and 2 each having a respective guide layer 7 and 3 (see FIG. 2A), a mask 9 is placed on the top confinement layer 4. The shape of this mask is such that it covers all of the surface of the portion 2, which is for a passive ridge guide, for example, and defines the design of the waveguide stripe of the portion 1 to be etched to obtain a BRS active guide, for example.

Figure 2A:
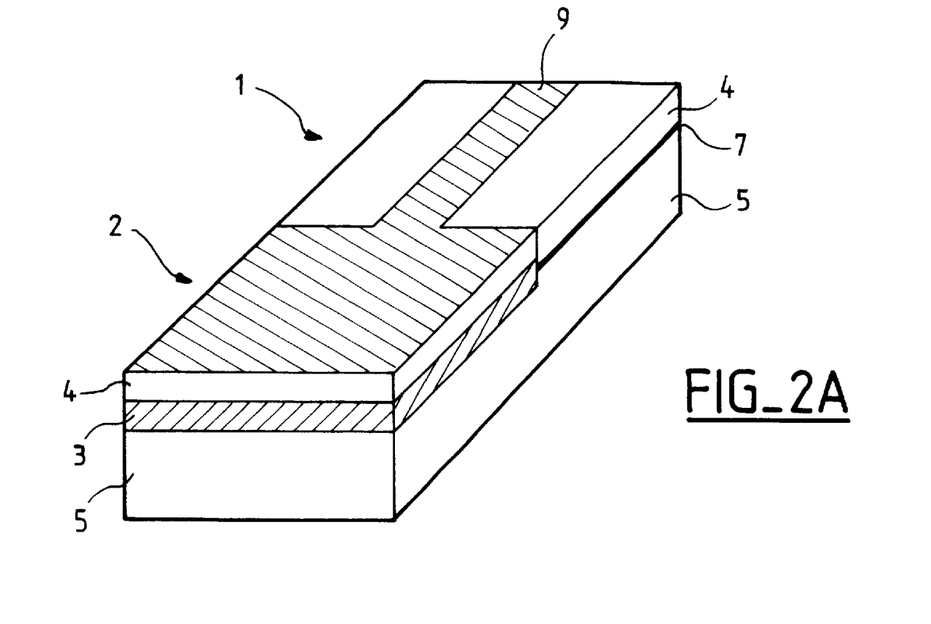
Figure 2B:
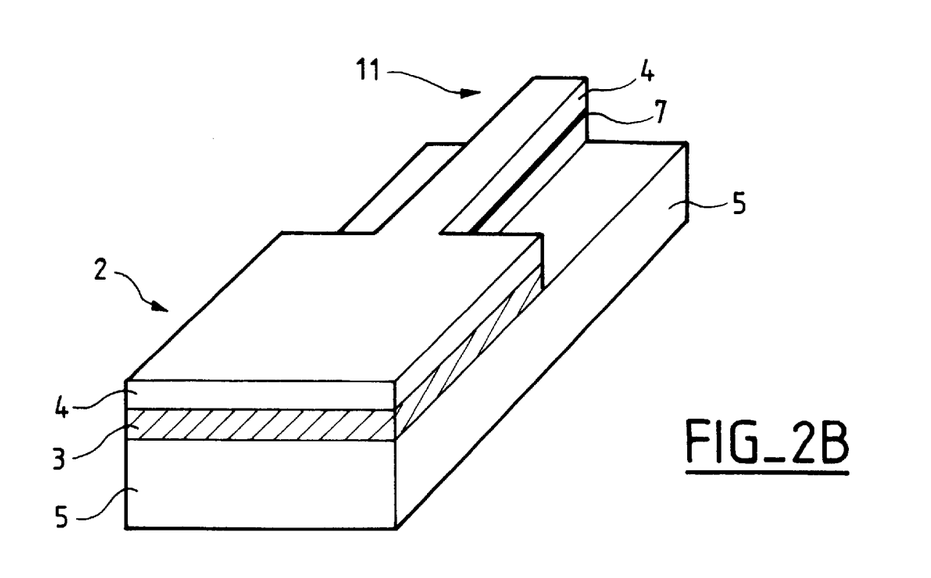

Accordingly, in a first step, only the BRS waveguide 11 is etched (FIG. 2B). Then, after removing the mask 9, a confinement layer 6 of p-doped InP, for example, is grown epitaxially over all of the surface of the circuit (FIG. 2C).

The final step, represented in FIG. 2D, then consists in protecting the first active component, including the BRS guide 11 formed in this way, with another mask and then etching the second portion 2, using an appropriate mask, to define the ridge stripe 12. However, the InP layer to be etched in order to etch the ridge stripe is very thick since it comprises the protective layer 4 and the layer 6 deposited during epitaxial growth. The total thickness to be etched to form the ridge stripe is typically at least 5 $\mu$m, compared with approximately 2 $\mu$m when the auto-alignment method is used. The ridge stripe obtained (FIG. 2D) is therefore fragile and breaks easily when cleaving the components, making it very difficult or even impossible to achieve good optical coupling.

One solution to the problem of avoiding this fragility of the ridge stripe is not to deposit any confinement layer 4 on the guide layer 3 of the portion 2 for the ridge guide, or at least to reduce the thickness of the confinement layer 4. In this case, the layer 6 of p-doped InP deposited during epitaxial growth is in direct contact with (or near) the ridge waveguide 3. The ridge waveguide 3 being passive in this example, it does not amplify the light signal and the p-doped InP causes greater propagation losses. This solution therefore degrades the performance of the passive component 2 with the ridge guide and therefore cannot be used to fabricate optical integrated circuits.

One aim of the invention is therefore to fabricate an optical integrated circuit comprising at least one BRS waveguide and at least one ridge waveguide which are butt coupled and defined by the auto-alignment method without creating excrescences in the transition area between the two types of guide.

SUMMARY OF THE INVENTION

To achieve this aim and to alleviate the drawbacks of the prior art, the invention more particularly proposes a method of fabricating an optical integrated circuit comprising at least one etched and buried BRS waveguide coupled to at least one etched but not buried ridge waveguide, said method comprising the following steps:

a- forming on a substrate at least a first area and a second area respectively comprising a first guide layer and a second guide layer, said first and second guide layers being buried and butt coupled, b- forming a first mask on said first and second areas to define the imprint of said BRS and ridge waveguides, c- protecting said second area with a second mask and etching said first area to define said BRS waveguide, d- removing said second mask and growing a layer on the surface of the two areas to form a confinement layer burying said BRS guide in said first area and a top layer in said second area, and e- protecting said first area with a third mask, etching away said top layer formed in said second area and then using said first mask to etch said second area and define said ridge waveguide.

Because of the successive etching of the waveguides and because the imprint of the waveguides is formed beforehand by means of a first mask deposited on both areas of the circuit, it is no longer necessary to protect the ridge waveguide with a silica protective layer during epitaxial growth.

In accordance with another feature of the invention, a barrier layer that is a barrier against etching of the materials of said top layer is deposited on said second area after said first step a-. When etching the top layer, this barrier layer preserves intact the surface of the second area and the first mask forming the imprint of the ridge guide to be formed.

In accordance with another feature of the invention, the first mask is made of a refractory metal. The refractory metal is not only resistant to the high temperatures used during epitaxial growth of the confinement layer but also enables nucleation of the decomposed species on or near the surface. A polycrystalline top layer is therefore formed on top of the first mask during deposition of the confinement layer. Because the material can grow on the first mask, it does not diffuse toward the transition area between the two types of guide, which prevents the formation of excrescences. Consequently, the phenomenon of diffusion of surface elements during epitaxial growth, causing excrescences to appear in the transition area, does not occur.

In accordance with another feature, a layer of dielectric material is deposited, before the second step b-, onto the first and second areas. The role of this layer is to form a diffusion barrier to prevent interdiffusion of elements constituting the first and second areas and the refractory metal and the formation of an alloy.

Other features and advantages of the invention will become apparent on reading the description given by way of illustrative example and with reference to the accompanying drawings.

BRIEF DESCRIPTION OF THE DRAWINGS

FIGS. 1A, to 1D, already described, are diagrammatic perspective views of an optical integrated circuit at various stages of its fabrication by a prior art method.

FIGS. 2A, to 2D, already described, are diagrammatic perspective views of another optical integrated circuit at various stages of its fabrication by a prior art method.

FIGS. 3A to 9C are diagrammatic representations of an optical circuit at various stages in its fabrication by the method of the invention.

DETAILED DESCRIPTION OF THE PREFERRED EMBODIMENTS

A preferred embodiment of the fabrication method in accordance with the invention consists in defining the imprint of the waveguides beforehand by means of first mask and producing the waveguide stripes successively.

The example described with reference to FIGS. 3A to 9C relates to a wavelength selector comprising an active component, for example a semiconductor optical amplifier (SOA) 20, between two passive components, for example wavelength-division multiplexers (WDM) 31, 32 each comprising a plurality of waveguide stripes, each stripe guiding a particular wavelength.

The top views of FIGS. 3A, 4A and 9A represent the three areas corresponding to the SOA active component 20 and the WDM passive components 31, 32 of the waveguide selector. For simplicity, the other figures show only two areas corresponding to the active component 20 and one of the passive components 31. Also for simplicity, the views in lateral section show only one waveguide stripe. However, the optical components can of course include a plurality of stripes, as shown in the top views of FIGS. 4A and 9A.

The invention is not limited to fabricating this type of circuit; it applies more generally to fabricating any optical integrated circuit comprising at least one etched and buried BRS waveguide stripe coupled to at least one etched but not buried ridge waveguide stripe. For example, the invention applies to the fabrication of Sagnac, Michelson or Mach-Zehnder interferometers incorporating optical amplifiers and passive guided optical circuits, WDM preamplifiers, switches employing optical gates or integrated modulator lasers.

A first step of the method in accordance with the invention consists in forming the various areas 20, 31, 32, respectively corresponding to the active and passive components. FIG. 3A is a diagrammatic top view of this structure and FIG. 3B is a diagrammatic view in longitudinal section of the two areas 20 and 31.

These areas are formed on a substrate 5. The area 20 for the active component comprises a stack of layers 21, 22, 27, 24, including a buried guide layer 27. The guide layer 27 is made of quaternary material, for example InGaAsP, having a forbidden band width equivalent to 1.5 $\mu$m. It can also comprise a plurality of layers of different kinds.

The area 31 for the passive component also comprises a stack of layers 33, 34, 35 including a buried guide layer 33 made from quaternary material, for example InGaAsP, having a forbidden band width equivalent to 1.1 $\mu$m.

The substrate 5 and the layers 22, 24, on the one hand, and 34, on the other hand, on respective opposite sides of the guide layers 27 and 33 are made from a III-V material, for example InP or GaAs. The layer 21 deposited directly on the substrate 5 in the area 20 constitutes a buffer layer, for example.

The top layer 35 in the area for the passive component 31 is a barrier layer. It is made from quaternary material, for example InGaAsP, which has a forbidden band width equivalent to 1.25 $\mu$m, and constitutes a natural carrier layer chemical etching of the InP material. The benefit of a layer of this kind is described in more detail with reference to FIG. 7B.

A second step of the method in accordance with the invention then consists in forming on the passive areas 31, 32 and the active area 20 a first mask 100 to be used to define the imprint of the ridge and BRS waveguide stripes to be etched.

The mask 100 is shown in the top view of FIG. 4A, the view in longitudinal section of FIG. 4B and the view in lateral section of FIG. 4C. It is preferably formed of a refractory material, for example titanium, tungsten or molybdenum or one of their alloys. The reasons why the first mask 100 is made from refractory metal are explained with reference to FIGS. 5, 6A and 6B.

A layer 150 of dielectric material can be deposited before forming the first mask 100. The dielectric layer 150 provides a barrier to diffusion between the metal of the first mask 100 and the layers 35 and 24 to prevent the formation of an alloy. It is made of silicon nitride, silicon oxide or silicon oxynitride ($SiO_2$, $Si_3N_4$, SiON), for example, or some other material having similar interdiffusion barrier properties. The diffusion barrier layer can be deposited using any conventional deposition technique, for example vapor phase deposition, optionally assisted by a plasma, evaporation or spraying.

The first mask 100 is formed in the conventional manner in two steps. Initially, the refractory material constituting the mask is deposited onto the surface of the areas 20, 31, 32. A photosensitive resin is then deposited on the metal layer to provide a mask for etching the metal layer to obtain the first mask 100 for forming the imprint of the active and passive waveguides. The metal layer is etched using the reactive ion etching (RIE) process and an $SF_6$/Ar mixture, for example. A $CHF_3/O_2$ mixture can then be used to etch the diffusion barrier layer 150 when this is deposited on the area 20, 31, 32 before the metal layer. The photosensitive resin used as the mask for this etching is then removed.

The stripes can be etched when the imprint of the waveguides has been obtained using the first mask 100. The BRS and ridge guide stripes are etched successively. Initially the area for the passive component 31, covered by the first mask, is protected by a photosensitive resin 50 for etching the active waveguide stripe(s) (FIG. 5). A reactive ion etching process using a $CH_4/H_2$ mixture is used to etch the guide(s), for example. The unetched area 31 and at least one active guide ribbon are then obtained, as shown in the diagrammatic perspective view of FIG. 5.

The part of the first mask 100 on the surface of the BRS guide stripe etched in this way in the area 20 is then locally removed by plasma etching (for example reactive ion etching) or chemical etching using a solution based on hydrofluoric acid, for example.

The next step of the method consists in burying the BRS active waveguide etched in this way. For this, a cladding layer 60, or confinement layer, is grown epitaxially to bury the previously etched guide stripe(s). The cladding layer 60 can comprise a p-doped InP first layer and then a p-doped InGaAs layer, for example. These layers are deposited by high or low pressure MOCVD (Metal Organic Chemical Vapor Deposition) epitaxial processes, MBE (Molecular Beam Epitaxy), LPE (Liquid Phase Epitaxy) or CBE (Chemical Beam Epitaxy).

The active guide stripe(s) are then buried in the confinement layer 60, as shown in the perspective view of FIG. 6A and in the view in lateral section of FIG. 6B.

Because the first mask 100 has been positioned beforehand in the area 31 for the passive component, to form an imprint for the ridge waveguide to be etched, it is not necessary in this case to protect the area 31 with a silica layer. Furthermore, because the first mask 100 is preferably made from a refractory metal such as Ti, W or Mo or one of their alloys, it encourages nucleation of surface species during epitaxial growth by a selective process (MOCVD, CBE, LPE) or under selective conditions (high temperature MBE, for example). In this case, the first mask therefore serves as a support for growing a polycrystalline top layer 61. Accordingly, because the first mask has encouraged the nucleation and formation of a polycrystalline layer, the surface species do not diffuse toward the transition area between the active and passive components, which avoids the appearance of excresences. Also, the top layer is monocrystalline on either side of the mask, i.e. on top of the monocrystalline barrier layer 35. FIG. 6A shows this monocrystalline portion 62 of the top layer.

In a different embodiment, the first mask 100 is formed of a plurality of layers of different refractory materials. For example, the mask can include a layer of tungsten covering a first layer of titanium. In this example, the titanium improves the adhesion of the mask to the layer 150 of oxide or oxy-nitride deposited to form a diffusion barrier.

The active component 20 can then be completed by depositing localized metallization on top of the BRS guide stripe(s) to form electrodes. Also, to reduce leakage currents, lateral insulation of the confinement layer 60 is achieved by proton implantation. These steps of finishing the active component 20 employ techniques well known to the skilled person. Of course, these operations can be carried out afterwards, in a subsequent step of the process. FIGS. 7A, 9A and 9B show the metallization 75 and FIGS. 7A and 9B show the lateral insulation areas 70.

At this stage of the fabrication process, the active component 20 comprising one or more BRS waveguide stripes is complete. It is therefore necessary to produce the passive component 31 next and to etch the ridge stripe(s). For this, the active component 20 is protected by a mask 90 of silica, for example, as shown in the sectional view of FIG. 7A.

The top layer 62, 61 deposited on the surface of the area 31 during epitaxial growth is then etched away. If the top layer is a layer of InP or InGaAs, the etching is performed in two stages. Firstly, selective etching of the InGaAs layer relative to the InP layer is carried out using a chemical solution based on sulfuric acid ($H_2SO_4, H_2O_2$ and $H_2O$), for example, or phosphoric acid ($H_3PO_4, H_2O_2$ and $H_2O$). Then, further selective etching of the InP layer relative to the InGaAs layer is carried out using a chemical solution based on HCl or HBr, for example.

The etching is stopped by the barrier layer 35. This layer 35, deposited beforehand, constitutes a natural barrier layer to etching of the material of the top layer, which is InP in this example. Thus the surface of the area 31 formed in the first step, on which is positioned the refractory metal first mask 100 defining the imprint of the ridge guide (FIG. 7B), remains intact.

The first mask 100 is then used to etch the ridge waveguide stripe(s). This etching uses an ion etching process, for example the RIE process and a $CH_4/H_2$ mixture. Because the first mask is made from a refractory material, it has the additional advantage of being highly resistant to ion bombardment. This etching of the ridge stripe(s) produces the circuit shown diagrammatically in FIG. 8.

At this stage of the fabrication process etching is used to reveal various crystal planes of the component. Thus the substrate has laterally, i.e. in the portions on either side of the waveguide stripe(s), (111) crystal planes that come out if the active stripe has the (011) orientation. These (111) planes are transferred from the confinement layer to the substrate at the time of etching by the RIE process. Also, the portion of the confinement layer 60 that extends the stripe formed by the mask 100 and buries the BRS waveguide with the (011) orientation has (211) crystal planes.

The final step is then to remove the silica first mask 90 deposited on the active component 20 and the first mask 100. The masks can be removed using a solution based on hydrofluoric acid, for example, or by plasma etching. On the other hand, it is not necessary to remove the barrier layer 35 as it does not interfere with the operation of the circuit. The finished circuit is shown diagrammatically in FIGS. 9A to 9C.

Using the method in accordance with the invention described, i.e. by virtue of the fact that the BRS and ridge guide stripes are etched successively, and by virtue of the fact that the mask used to define their imprint enables nucleation of surface species during epitaxial growth, the appearance of excrescences is avoided. The quality of the waveguides is also preserved. Moreover, the method of the invention is economical because it uses standard operations and equipment.

The process can be applied to the fabrication of all optical circuits integrating etched and buried BRS guide stripes and etched but not buried ridge guide stripes.

There is claimed:

1. A method of fabricating an optical integrated circuit comprising at least one etched and buried BRS waveguide coupled to at least one etched but not buried ridge waveguide, said method comprising the following steps:

a- forming on a substrate at least a first area and a second area respectively comprising a first guide layer and a second guide layer, said first and second guide layers being buried and butt coupled, b- forming a first mask on said first and second areas to define the imprint of said BRS and ridge waveguides, c- protecting said second area with a second mask and etching said first area to define said BRS waveguide, d- removing said second mask and growing a layer on the surface of the two areas to form a confinement layer burying said BRS guide in said first area and a top layer in said second area, and e- protecting said first area by a third mask, etching away said top layer formed in said second area and then using said first mask to etch said second area and define said ridge waveguide.

2. A method as claimed in claim 1 wherein a barrier layer to etching of the materials of said top layer is deposited on said second area after said first step a-.

3. The method claimed in claim 1 wherein said first mask is made of a refractory metal.

4. The method claimed in claim 3 wherein said refractory metal used for said first mask is titanium, tungsten, molybdenum or one of their alloys.

5. The method claimed in claim 3 wherein said first mask comprises a plurality of layers of different refractory materials.

6. A method as claimed in claim 1 wherein, before said second step b-, a dielectric material layer is deposited on said first and second areas to form a diffusion barrier.

7. The method claimed in claim 6 wherein said dielectric layer comprises silicon nitride, silicon oxide or silicon oxy-nitride.

* * * * *